(No Model.)

T. R. FISCHER.
SKEWER FOR CLOSING FOWLS.

No. 504,777. Patented Sept. 12, 1893.

Witnesses
R. F. Heck.
Chas. W. Blackwood

Inventor
Therese R. Fischer
by Blackwood Bros.
Attorneys.

UNITED STATES PATENT OFFICE.

THERESE R. FISCHER, OF BALTIMORE, MARYLAND.

SKEWER FOR CLOSING FOWLS.

SPECIFICATION forming part of Letters Patent No. 504,777, dated September 12, 1893.

Application filed April 1, 1893. Serial No. 468,627. (No model.)

*To all whom it may concern:*

Be it known that I, THERESE R. FISCHER, a citizen of the United States of America, residing at Baltimore, Maryland, have invented a new and useful Improvement in Skewers for Closing Fowls, &c.; and I do hereby declare the following to be a full, clear, and exact description of the invention, such as will enable others skilled in the art to which it appertains to make and use the same.

My invention relates to an improvement in skewers for closing fowls, &c.

It has for its object to provide means whereby the openings cut in fowls to clean and stuff the same, may be closed in a convenient and effective manner.

My invention consists of a skewer formed of a continuous piece of wire bent upon itself and twisted together to form a central stem, and provided at certain intervals with approximately U-shaped adjustable cross-pieces which pass between the wires forming said stem and are held therein.

While the above described manner of forming the skewer is the most desirable both for cheapness of construction and effectiveness of operation, other methods may be employed which come within the spirit of my invention.

My invention is illustrated in the accompanying drawings in which—

Figure 1:
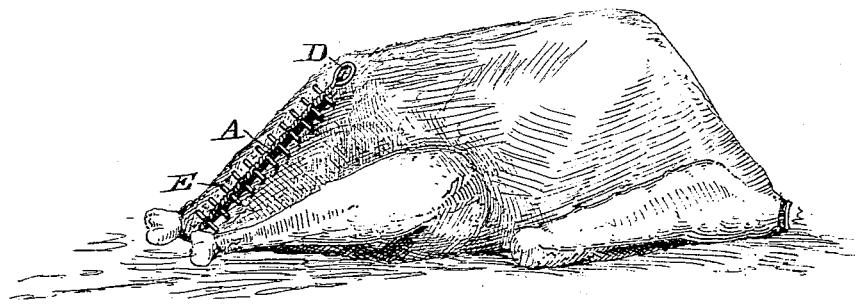
Figure 2:
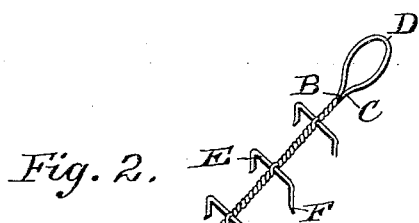
Figure 4:
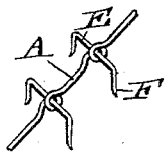
Figure 3:
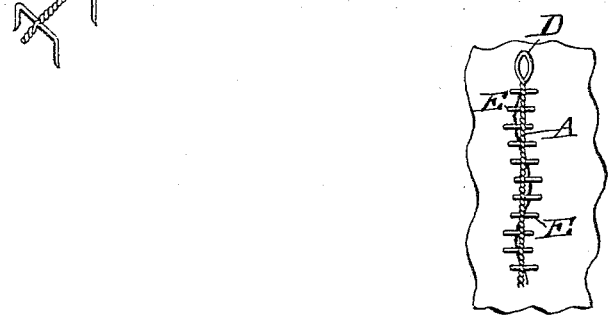

Figure 1— is a perspective view of my skewer in position on a fowl; Fig. 2— a perspective view of the skewer; Fig. 3— a detail view of the skewer showing the position of the parts when applied to an irregular cut. Fig. 4— shows a modified form of the skewer.

In the drawings: A designates the central stem formed by twisting the two pieces of wire B, C, together, one end of which is provided with a loop D.

E are the adjustable cross-pieces which are supported in the central stem A, the ends of which are provided with prongs F sharpened and bent slightly outward to facilitate their easy insertion into the flesh and insure their detention therein.

The operation of the device is as follows: When a fowl is filled, the walls of the opening are drawn together, the skewer placed over the line of the cut, the central stem A registering therewith or nearly so. The cross-pieces F are then pressed down causing the prongs on the ends thereof to penetrate the flesh, on each side of the opening, and thereby holding its walls together. When it is desired to remove the skewer, for the purpose of getting at the contents of the fowl, it is only necessary to take hold of the loop provided for that purpose on the end of the skewer and pull it upward, thereby disengaging the prongs, thus affording access to the contents of the fowl. Owing to the lateral adjustability of the cross-pieces F in the central stem A, the device can be adjusted to any irregularities of the opening.

Having thus described my invention, what I claim is—

1. A skewer, composed of a central stem provided with cross-pieces having prongs on their outer ends, substantially as described.

2. A skewer, the central stem formed of one piece of wire bent upon itself and twisted together and provided with cross pieces having prongs on their outer ends, substantially as described.

3. A skewer, the combination of the central stem, with the adjustable cross-pieces supported therein, substantially as described.

In testimony whereof I affix my signature in presence of two witnesses.

THERESE R. FISCHER.

Witnesses:
GEO. L. HAMMERBACHER,
CHARLES F. EVANS.